Aug. 18, 1925. Re. 16,142

R. S. BURDETTE

AIR BAG AND METHOD OF CONSTRUCTING THE SAME

Original Filed Sept. 29, 1921 2 Sheets-Sheet 1

INVENTOR
Richard S. Burdette,
BY
R. D. Frogner
ATTORNEY

Ray Rousseau

Aug. 18, 1925. Re. 16,142

R. S. BURDETTE

AIR BAG AND METHOD OF CONSTRUCTING THE SAME

Original Filed Sept. 29, 1921 2 Sheets-Sheet 2

INVENTOR
Richard S. Burdette,
BY A. D. Trogner
ATTORNEY

Ray. Roussiau

Reissued Aug. 18, 1925.

Re. 16,142

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

AIR BAG AND METHOD OF CONSTRUCTING THE SAME.

Original No. 1,412,799, dated April 11, 1922, Serial No. 504,211, filed September 29, 1921. Application for reissue filed June 27, 1925. Serial No. 40,119.

*To all whom it may concern:*

Be it known that I, RICHARD S. BURDETTE, a citizen of the United States, and resident of Akron, Ohio, have invented new and useful Improvements in Air Bags and Methods of Constructing the Same, of which the following is a specification.

My invention relates to improvements in airbags and to methods of constructing such articles, and comprehends particularly that class of bags designed for use to effect expansion of a tire casing against its mold, or wrapping, as applied in the tire manufacturing and repair industry.

In my copending application, Serial No. 502,965, I have disclosed a type of airbag, that embodies, in its structure, reinforcing features which are designed to prevent, in operation, expansion of the bag in the direction of its major axis, and to permit of its expansion in a lateral direction.

The present invention is directed, broadly, toward providing an improved structure over that disclosed in said copending application, and a practical method of constructing the improved article.

Specifically, the invention comprehends a more advantageous arrangement and utilization of the materials comprising the reinforcing features disclosed, in principle, in said copending application, with the particular aim in view of accomplishing an appreciable saving in such materials, and at the same time of providing an article that possesses superior structural and functioning characteristics.

The foregoing, and other advantages, may be obtained in airbag construction, through the practice hereinafter described in detail, and illustrated in the accompanying drawings as exemplifying preferred embodiments of my invention.

In the drawings accompanying and forming a part of this specification:

Figure 1:
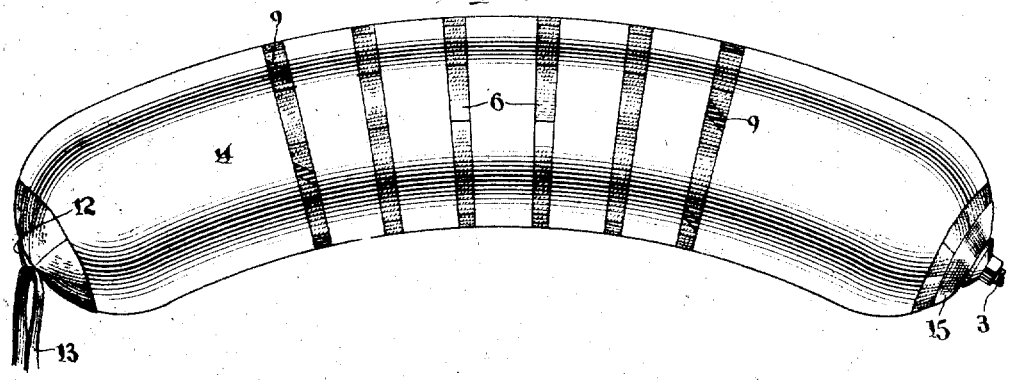
Fig. 1 is a side elevational view of a preferred type of airbag constructed through the practice of this invention.

Referring to the drawings, and particularly to Figs. 1 to 4, which illustrate a preferred type of airbag constructed in accordance with the invention, it will be seen that the structure comprises, in general, certain basic features set forth in my before mentioned copending application. That is to say, it includes an expansible body portion, or container, 1 that is adapted to expand under internal fluid pressure, and a casing 2 that embodies structural features designed to prevent elongation of the container, or to at least reduce such elongative action to a minimum degree. However, in this instance, the casing, instead of being formed in substantially a continuous piece, as in my copending application, is constructed of a plurality of elements which are formed, and relatively arranged, to constitute a superior type of casing that may be more readily and expeditiously incorporated with the container 1, and, moreover, may be constructed with a marked saving in cost, as will presently be apparent.

Figure 8:
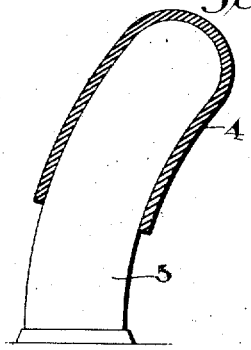
Fig. 8 is a sectional elevation, illustrating a step in the construction of the airbag.
Figure 10:
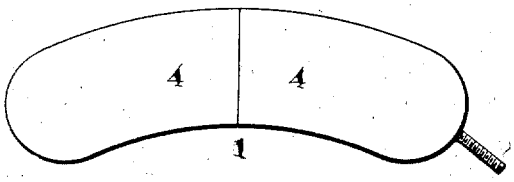
Fig. 10 is a side elevational view, illustrating still another step in the construction of the airbag.
Figure 9:
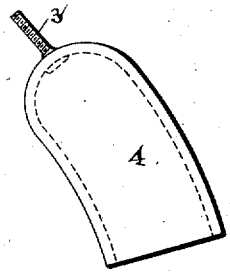
Fig. 9 is a side elevational view, illustrating a second step in the construction of the airbag.

The container 1 may be formed of any suitable composition of rubber, either partially vulcanized, or unvulcanized, and be provided with any suitable form of valve designated by the numeral 3. Preferably, it is constructed, as in my copending application, in half sections 4, one of which is illustrated in Fig. 8, each section being preshaped upon a mandrel such as that designated by the numeral 5. The valve stem 3 may be inserted in the end of either section as desired, or it may be positioned at a later stage in the construction of the container. The sections 4 may be assembled in the form shown in Fig. 10 by any suitable expedient. For instance, their open ends may be cemented together, or again, a liquid tight joint therebetween may be effected through the process of vulcanization.

Figure 2:
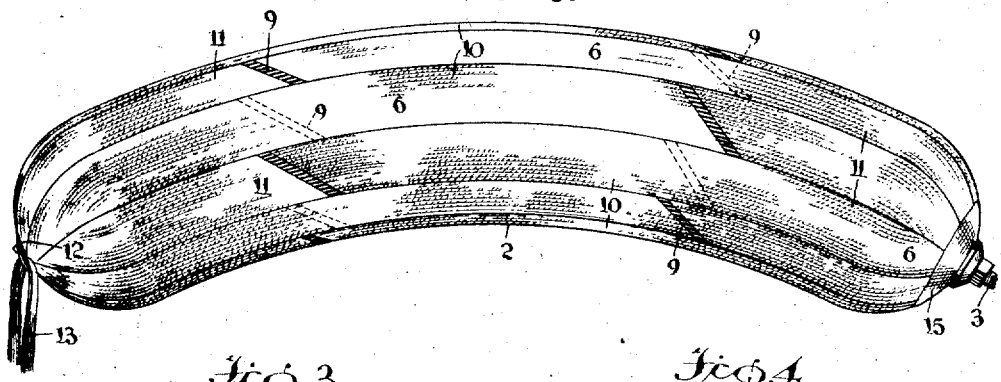
Fig. 2 is a similar view illustrating certain structural features of the airbag with other structural features eliminated.

The casing 2, as clearly shown in Fig. 2 of the drawings, is formed of a plurality of strips 6 of cord fabric that is cut in the direction of the lay of the cords, although it is to be understood that other materials may be utilized, for instance, fabric which possess, when cut in strip form, a capacity for stretch in a lateral direction with relatively less capacity for stretching action in the direction of the length of the strips. The strips 6 are arranged in pairs, the strips of each pair lying in alignment with their respective ends spaced from each other to provide slots 9, clearly shown in Fig. 2 of the drawings, and designed to serve a purpose presently explained. Preferably the ends of the strips 6 are cut on the bias to thereby form the slots 9 at an oblique angle, as clearly shown, and it is to be understood that as many strips may be utilized as will be deemed expedient. Also they may vary in width in accordance with the number used and the diameter of the container. Each strip 6 is so disposed relative to the container 1 that, intermediate its ends, it spans or traverses one end of the container, and provides a long end portion 10, and a relatively short end portion 11 that are arranged respectively upon opposite sides of the container, preferably, in parallelism with each other and in diametrically opposite relation with respect thereto. The function of these strips, as previously indicated, is to prevent elongation of the container when fluid under pressure is introduced therein, and in order to utilize the full strength of the cords of the strips to prevent such action of the container, I preferably arrange the strips to dispose the cords thereon substantially in parallelism with the major axis thereof. As shown in Fig. 2, the end portions 10 and 11 are arranged in edge to edge relation and in alternating order, that is to say, the long end 10 of one strip is positioned upon one side of the container and its short end upon the opposite side of the bag, while the contiguous strip is reversely arranged.

Figure 3:
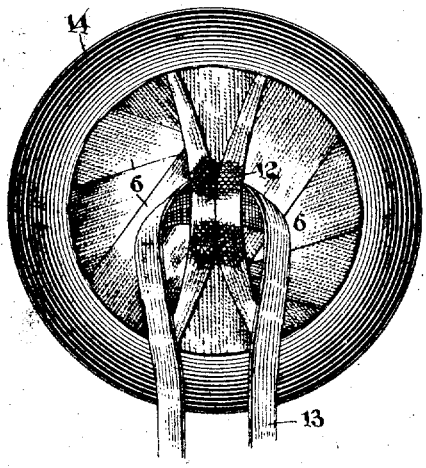
Fig. 3 is an end elevation, on an enlarged scale, of the bag shown in Fig. 1.
Figure 4:
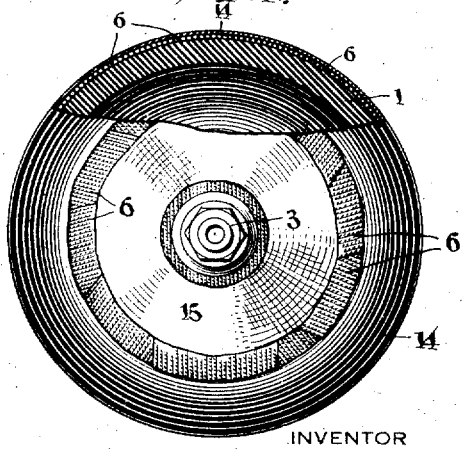
Fig. 4 is a similar view, with parts showing its section, of the opposite end of the bag shown in Fig. 1.

By virtue of this assembly of the ends 10 and 11 of each strip, a dove-tail arrangement of the strip ends is effected, with the long end of one strip lying intermediate the long ends of adjacent strips, as clearly shown in Fig. 2 of the drawings. Also this assembly of the strips 6 provides for an angulated, superposed, relation of those portions thereof that span the ends of the container 1. An additional reinforcement is thereby provided for the container at the apices of its end portions, as shown in Figs. 3 and 4 of the drawings. Such reinforcement is highly desirable, since these portions of the bag are in no way supported by the mold or wrapping during the vulcanizing process, as will readily be seen. In connection with the relation of the strips at the ends of the container, it will be noted that one, or, if desired, several, of the strips is provided with a free portion at the apex of one end of the container which serves as a loop to which a suitable handling medium, such as a tape 13, may be attached in the manner illustrated in Fig. 3.

The structure so far described is provided with an exterior coating 14 of resilient vulcanizable material, that is disposed thereon in such manner that the free ends of the casing are exposed, and also certain intermediate portions of the casing, preferably those in which the slots 9 occur. One end of the casing, or both, if desired, may be provided with an additional reinforcement in the form of a cap piece, designated by the numeral 15, which may be formed of any suitable material, either flexible, as indicated in the drawings, or otherwise.

The structure thus formed is next vulcanized in a mold, and under internal pressure that is admitted through the valve stem 3, whereby the material of the container 1, the cord elements of the strips 6, and the coating 14 are formed into a composite structure, as will be readily understood.

The slots 9 and the peculiar disposition of the coating 14 are designed to serve a specific purpose of great importance particularly during the vulcanizing operation. When the bag is placed in the mold, to subject it to the vulcanizing operation, the materials comprising the airbag are subjected to great compression by the fluid pressure therewithin, which forces them against the mold. Obviously, any air which has become entrapped between the container 1 and the strips, or between the strips and the coating, during the assembly of these elements must be released in order that the formation of air pockets between these several materials may be prevented, and the deteriorating effects upon the bag of this particular contingency removed from consideration. By spacing the ends of the strips, in the manner described, to form the slots 9, and leaving portions of the several slots, together with the end portions of the casing, exposed, such accumulated air will be free to escape, principally through the slots 9, before the materials have become so united or solidified as to prevent this action.

Figure 5:
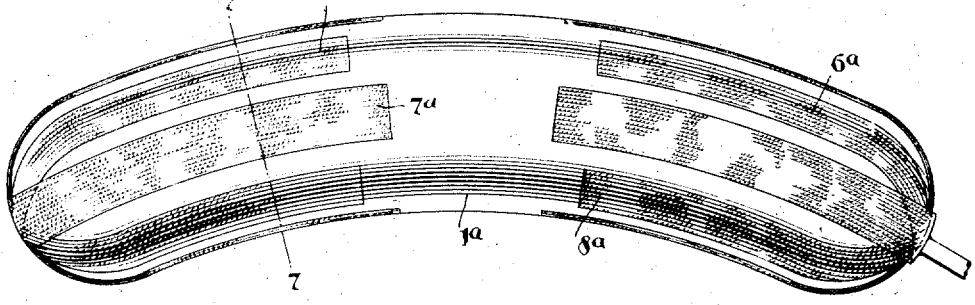
Fig. 5 is a side elevational view of a modified form of the invention.
Figure 6:
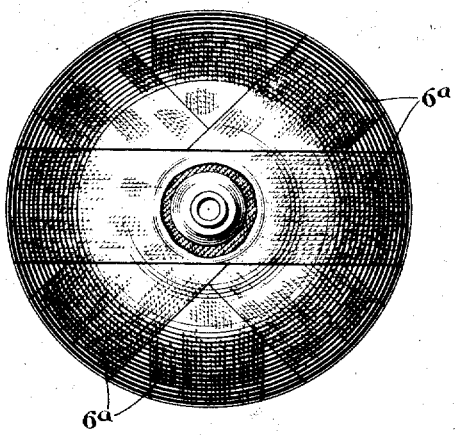
Fig. 6 is an end view of the bag shown in Fig. 5, illustrated on an enlarged scale.
Figure 7:
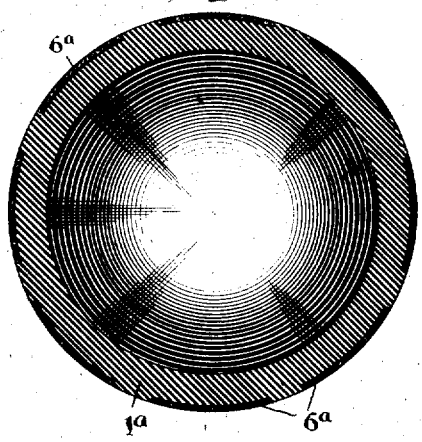
Fig. 7 is a transverse section, on an enlarged scale, taken on the line 7—7 of Fig. 5.

In Figs. 5 to 7 a modified structure has been illustrated in which the strips $6^a$ are arranged in spaced relation around the container $1^a$. It will be noted, however, that in this instance the strips reinforce only the end portions of the container. In other words they are arranged to leave a free zone of the container exposed intermediate its end portions. In other respects the arrangement of the strips per se is substantially the same as that previously described, that is to say each strip spans one end of the container $1^a$, and preferably comprises a long end portion $7^a$ and a short end portion $8^a$ which are disposed, respectively, in parallelism upon opposite sides of the container $1^a$, and in the direction of the length thereof. In this form, however, the ends of each strip may be of even length, but of alternately different length for each strip.

In certain sizes of air bags a reinforcement of this nature has been found advantageous in preventing, to a satisfactory degree, elongation of the container, and to provide a relatively more flexible article.

Although a preferred form of the invention has been illustrated and described, together with one logical modification thereof, it will be appreciated that both the structures and the method herein described are susceptible of a wide range of modification. For instance, instead of utilizing strips of cord fabric, in which the cords are held together by a vulcanizable medium, similar cord elements may be used singly or in clusters, or, as previously stated, strips of fabric may be used in which the capacity for stretch in the lengthwise threads is negligible when compared to that in the cross threads.

In other words, the disclosure is merely illustrative and is not to be viewed as in any way limiting the scope of the invention, unless such limitations are indicated in the appended claims.

What I claim is:

1. An elongate container adapted to receive fluid under pressure comprising a resilient body portion having incorporated therein flexible reinforcing strips arranged respectively to traverse one end of the body portion and to restrict expansive action of the body portion in a longitudinal direction only.

2. An elongate container adapted to receive fluid under pressure comprising a resilient body portion including strips of flexible reinforcing material arranged respectively to traverse one end of the body portion and to restrict expansive action of said body portion in a longitudinal direction only.

3. An elongate container adapted to receive fluid under pressure comprising a resilient body portion of vulcanized material having incorporated therein through the process of vulcanization flexible reinforcing strips arranged respectively to traverse one end of the body portion and to restrict expansive action of said body portion in a longitudinal direction only.

4. An elongate container adapted to receive fluid under pressure comprising a resilient body portion having incorporated therein strips of flexible unwoven material arranged respectively to traverse one end of the body portion and to restrict expansive action of said body portion in a longitudinal direction only.

5. An elongate container adapted to receive fluid under pressure comprising a resilient vulcanized body portion having incorporated therein strips of cord fabric arranged to restrict elongation of the body portion while permitting free expansion thereof in a transverse direction.

6. An elongate container adapted to receive fluid under pressure comprising a resilient vulcanized body portion having incorporated therein strips of cord fabric arranged to restrict elongation of said body portion while permitting free expansion thereof in a transverse direction said strips being disposed in edge to edge relation.

7. An elongate container adapted to receive fluid under pressure comprising a resilient body portion including non-stretchable reinforcing strips arranged respectively to traverse opposite side portions and one end of the body portion the side traversing portions of each strip being disposed substantially in parallelism with the major axis of said body portion.

8. An elongate container adapted to receive fluid under pressure comprising a resilient body portion including non-stretchable reinforcing strips adapted respectively to traverse opposite sides of said body portion and one end thereof.

9. An elongate container adapted to receive fluid under pressure comprising a resilient body portion having incorporated therein flexible reinforcing strips adapted respectively to traverse opposite side portions of the body portion and one end thereof.

10. An elongate container adapted to receive fluid under pressure comprising a resilient body portion having incorporated therein flexible reinforcing elements arranged respectively in —U— formation to traverse one end of the body portion the individual ends of each element being disposed substantially in parallel relation and upon opposite sides of the body portion.

11. An elongate container adapted to receive fluid under pressure comprising a resilient body portion having incorporated therein strips of flexible material arranged respectively in —U— formation to traverse one end of the body portion the individual ends of each strip being disposed in parallelism with the major axis of the container and upon opposite sides thereof.

12. An elongate container adapted to receive fluid under pressure comprising a resilient body portion having incorporated therein strips of flexible unwoven material arranged respectively to traverse one end of the body portion and to provide end portions disposed in the direction of the length of said body portion to restrict its expansive action in a longitudinal direction only.

13. An elongate container adapted to receive fluid under pressure comprising a resilient body portion having incorporated therein strips of flexible material embodying unconnected cord elements disposed in parallelism, said strips being arranged respectively to traverse one end of the body portion and to provide end portions disposed in the direction of the length of said body portion to thereby restrict its expansive action in a longitudinal direction only.

14. An elongate container adapted to receive fluid under pressure comprising a resilient body portion having incorporated therein a plurality of strips of flexible material disposed in aligned pairs and arranged to respectively traverse one end of the body portion and to provide a long and relatively short end portion for each strip arranged respectively upon opposite sides of the body portion in the direction of the length thereof.

15. An elongate container adapted to receive fluid under pressure including a body portion having incorporated therein a plurality of strips of flexible material each strip being arranged to span one end of the body portion and to provide a long and a relatively short end portion disposed respectively upon opposite sides of the casing in parallelism with the main axis thereof said end portions being disposed in edge to edge position and in alternating order to effect a dove-tail arrangement of the long end portions thereof.

16. An elongate container adapted to receive fluid under pressure including a body portion having incorporated therein a plurality of strips of flexible material disposed in pairs of aligned strips each of which is arranged to span one end of the body portion and to provide a long and a relatively short end portion disposed respectively upon opposite sides of the casing in the direction of the length thereof said end portions being disposed in edge to edge relation and in alternating order to effect a dove-tail arrangement of the long end portions and also to provide a slot between contiguous ends of aligned strips one of said strips being adapted to provide a loop at one end of the body portion, and a coating of resilient material for said casing adapted to expose said end portions and said slots.

17. The herein described method that comprises, constructing an expansible elongate container of vulcanizable material, positioning a reinforcing medium in strip form against the walls thereof to subsequently restrict their expansive action in the direction of the length of the container, and vulcanizing the structure thus formed to incorporate the reinforcing medium in the walls of the container.

18. The method of making airbags that comprises constructing an expansible container of vulcanizable material, positioning strips of vulcanizable material against the walls thereof in the direction of the length of the container, and vulcanizing the structure thus formed to incorporate the strips with the material of the container whereby said container is restricted against expansion in the direction of its length.

19. The method of making airbags that comprises, constructing an expansible container of vulcanizable material, positioning strips of cord fabric against the walls thereof in the direction of the length of the container, and vulcanizing the structure thus formed to incorporate the strips with the material of the container whereby said container is restricted against expansion in the direction of its length.

20. The method of making airbags that comprises constructing an expansible container of vulcanizable material, applying strips of cord fabric in —U— formation about the end portions of the container and in the direction of the length thereof, and vulcanizing the structure thus formed to incorporate the strips with the material of the container whereby said container is restricted against expansion in the direction of its length.

21. The method of making airbags that comprises constructing an elongate expansible container in half sections, assembling the sections, positioning strips of cord fabric to traverse the end portions of the container and to dispose the ends of the strips in the direction of its length, and vulcanizing the structure thus formed to incorporate the strips with the material of the container whereby said container is restricted against expansion in the direction of its length.

In witness whereof, I have hereunto signed my name.

June 9, 1925.

RICHARD S. BURDETTE.